United States Patent
Wright et al.

(10) Patent No.: US 9,489,165 B2
(45) Date of Patent: *Nov. 8, 2016

(54) SYSTEM AND METHOD FOR VIRTUAL DISPLAYS

(71) Applicant: Apple Inc., Cupertino, CA (US)

(72) Inventors: Christopher P. Wright, Cupertino, CA (US); Kenneth C. Dyke, Los Altos, CA (US); Assana M. Fard, Sunnyvale, CA (US); Thomas W. Costa, Nevada City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,527

(22) Filed: Feb. 1, 2016

(65) Prior Publication Data

US 2016/0147494 A1    May 26, 2016

Related U.S. Application Data

(63) Continuation of application No. 13/781,335, filed on Feb. 28, 2013, now Pat. No. 9,250,700.

(51) Int. Cl.
  *G06F 15/16* (2006.01)
  *G06F 3/14* (2006.01)
  *G06F 3/01* (2006.01)
  *G06F 9/44* (2006.01)
  *G06F 3/0484* (2013.01)
  *H04L 29/08* (2006.01)

(52) U.S. Cl.
  CPC .............. *G06F 3/1423* (2013.01); *G06F 3/01* (2013.01); *G06F 3/0484* (2013.01); *G06F 9/4445* (2013.01); *H04L 67/10* (2013.01); *H04L 69/329* (2013.01)

(58) Field of Classification Search
  CPC .................... H04L 29/06; H04L 29/08072
  USPC .................................. 709/201, 230
  See application file for complete search history.

(56) References Cited

U.S. PATENT DOCUMENTS

| | | |
|---|---|---|
| 7,392,172 B2 | 6/2008 | Rostampour |
| 8,589,800 B2 | 11/2013 | Kominac et al. |
| 8,707,185 B2 | 4/2014 | Robinson et al. |
| 8,990,292 B2 | 3/2015 | Baird et al. |
| 9,250,700 B2 | 2/2016 | Wright et al. |
| 2010/0321395 A1 | 12/2010 | Maciesowicz et al. |
| 2011/0179106 A1 | 7/2011 | Hulse et al. |
| 2012/0042252 A1 | 2/2012 | Neerudu et al. |
| 2012/0086716 A1 | 4/2012 | Reeves et al. |
| 2012/0176396 A1 | 7/2012 | Harper et al. |
| 2012/0317295 A1 | 12/2012 | Baird et al. |
| 2014/0101554 A1 | 4/2014 | Morris |
| 2014/0184622 A1 | 7/2014 | Xia |

OTHER PUBLICATIONS

International Search Report and Written Opinion from PCT/US2014/018517, mailed May 16, 2014, Apple Inc., pp. 1-4.

*Primary Examiner* — Andy Ho
(74) *Attorney, Agent, or Firm* — Robert C. Kowert; Meyertons, Hood, Kivlin, Kowert & Goetzel, P.C.

(57) ABSTRACT

An operating system creates one or more virtual display interfaces for communication of display data and user input events between the application layer and one or more virtual display devices. The one or more virtual display devices are not physically connected to the computing system managed by the operating system. One or more applications are executed in an application layer. At least one of the one or more applications communicates display data to and receives user input events from at least one of the one or more display devices using at least one of the display interfaces. At least one other of the one or more applications communicates display data to and receives user input events from at least one of the one or more virtual display devices using at least one of the one or more virtual display interfaces.

20 Claims, 11 Drawing Sheets

Create one or more display interfaces for communication of display data and user input events between an application layer and one or more display devices, each of which is physically connected to a computing system managed by the operating system
804

Create one or more virtual display interfaces for communication of display data and user input events between the application layer and one or more virtual display devices, each of which is not physically connected to the computing system managed by the operating system
808

Communicate display data to and receive user input events from at least one of the one or more display devices using at least one of the display interfaces
812

Communicate display data to and receive user input events from at least one of the one or more virtual display devices using at least one of the one or more virtual display interfaces
816

Transmit the display data from the at least one other of the one or more applications to a remote computing system housing a target display device over a network connection
820

FIG. 8

SYSTEM AND METHOD FOR VIRTUAL DISPLAYS

This application is a continuation of U.S. patent application Ser. No. 13/781,335, filed Feb. 28, 2013, now U.S. Pat. No. 9,250,700, which is hereby incorporated by reference herein in its entirety.

BACKGROUND

1. Technical Field

This disclosure relates generally to the use of video displays, and more specifically to the management of images on display devices.

2. Description of the Related Art

In some situations, there is a need to display the multiple images simultaneously on multiple displays physically connected to a computer system, where each display shows a different image. For example, consider a system with a computing device having an internal display and an external interface to which an external display is coupled. This system may be used for a presentation (e.g., for a software demonstration to an audience in a large room). The presenter may wish to view the demonstration on the device's internal display while the audience views the demonstration on the external display. The presenter may configure the system to operate in this mode and/or select the resolution and/or other parameters for rendering the image content on the internal and/or external displays by explicitly specifying multiple display options using multiple user interface mechanisms.

In another example, a system with a computing device having an internal display and an external interface to which an external display is coupled may be used by a single user running an application that displays large amounts of information. The user may wish to view the information across both the internal and the external displays (e.g., in an extended desktop mode). The user may configure the system to operate in this mode and/or select the resolution and/or other parameters for rendering different portions of the image content on the internal or external displays by explicitly specifying multiple display options using multiple user interface mechanisms. Both of these examples require physical connection of the display device to the computing system.

SUMMARY

An operating system creates one or more virtual display interfaces for communication of display data and user input events between the application layer and one or more virtual display devices. The one or more virtual display devices are display devices (which may be physical display devices or display devices merely simulated in software) not physically connected to the computing system managed by the operating system. One or more applications are executed in an application layer. At least one of the one or more applications communicates display data to and receives user input events from at least one of the one or more display devices using at least one of the display interfaces. At least one other of the one or more applications communicates display data to and receives user input events from at least one of the one or more virtual display devices using at least one of the one or more virtual display interfaces.

BRIEF DESCRIPTION OF THE DRAWINGS

FIG. 8 is a flow diagram illustrating one embodiment of a method for using virtual displays with network transmission.

Figure 1:
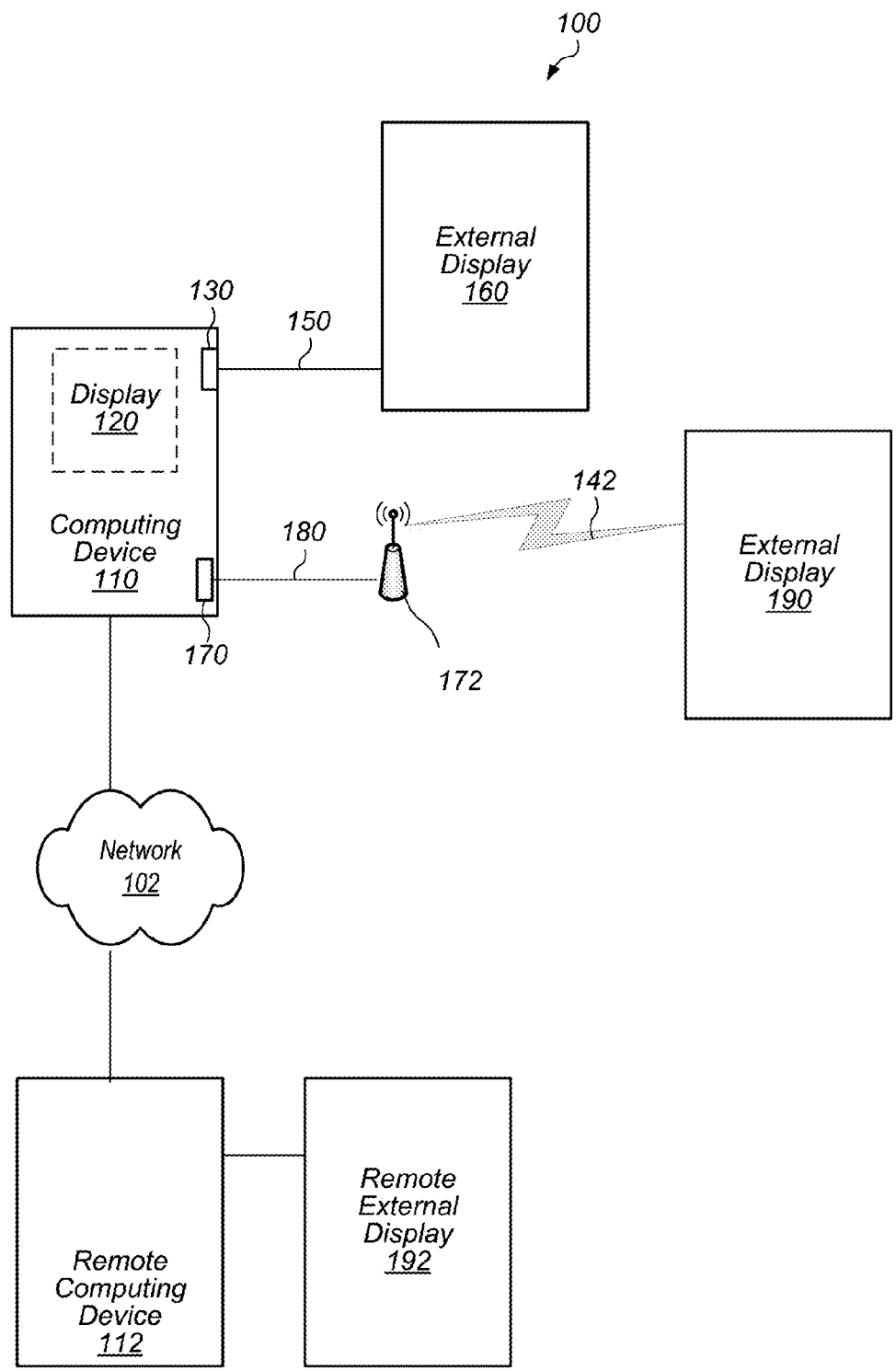
FIG. 1 is a block diagram illustrating one embodiment of a computer system having multiple displays, both physically attached and not physically attached to the computer system.

This specification includes references to "one embodiment," "an embodiment," "one implementation," or "an implementation." The appearances of these phrases do not necessarily refer to the same embodiment or implementation. Particular features, structures, or characteristics may be combined in any suitable manner consistent with this disclosure.

Further, various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

DETAILED DESCRIPTION

As noted above, computing devices of various types may or may not include an internal display and may or may not be physically connected to one or more external displays. Embodiments of the present disclosure allow the configuration of a computing device and one or more virtual displays, so that content is rendered and stored in memory for subsequent use. Examples of such use include but are not limited to transmission to a physical display device over a radio frequency link, transmission to a physical display device over a network link, simulation, and creation and display of a simulated window within a viewing window displayed on a display device physically connected to the computing system.

In some embodiments, an operating system creates one or more display interfaces. The one or more display interfaces are interfaces for communication of display data and user input events between an application layer and one or more display devices. Each of the one or more display devices is physically connected to a computing system managed by the operating system. The operating system creates one or more virtual display interfaces for communication of display data and user input events between the application layer and one or more virtual display devices. The one or more virtual display devices are not physically connected to the computing system managed by the operating system, and embodiments include both embodiments in which virtual display devices include physical screens and those in which the display device is merely simulated. One or more applications are executing in the application layer. At least one of the one or more applications communicates display data to and receives user input events from at least one of the one or more display devices using at least one of the display interfaces. At least one other of the one or more applications communicates display data to and receives user input events from at least one of the one or more virtual display devices using at least one of the one or more virtual display interfaces.

In some embodiments, executing the one or more applications in the application layer further includes generating output of the at least one other application for communication to the at least one of the one or more virtual display devices, and rendering from the output of the at least one other application, using hardware acceleration provided by a graphics processing unit, display data for display on the virtual display device. Some embodiments further perform transmitting the display data from the at least one other of the one or more applications to a target display device over a radio frequency connection. Some embodiments further perform transmitting the display data from the at least one other of the one or more applications to a remote computing system housing or connected to a target or physical display device over a network connection.

In some embodiments, output representing attributes of a window is generated. The window displays the interactive elements of a graphical user interface on at least one of the one or more virtual display devices using at least one of the virtual display interfaces in a simulation of a virtual display. The output is rendered, using the hardware acceleration provided by the graphics processing unit, for display on the one or more virtual display devices and displayed on the at least one of the plurality of display devices using at least one of the virtual display interfaces. In some embodiments, output representing attributes of a window is generated. The window displays the interactive elements of a graphical user interface on at least one of the one or more virtual display devices using at least one of the virtual display interfaces in a simulation of a virtual display. The output is rendered, using the hardware acceleration provided by the graphics processing unit, for display on the one or more virtual display devices and compared to expected values to appraise display performance.

Some embodiments further perform verifying a permission of a remote computing system housing or connected to a target display device to display the display data and transmitting the display data to the remote computing system housing the target display device over a network connection.

In some embodiments, a computer may detect the characteristics of a virtual display device display that is designated to receive output from the computer, and may generate output conforming to these characteristics, even if no such physical display exists.

In some embodiments, a computer may determine which options for rendering image content are preferred so that the content appears best on a selected virtual display (e.g., by selecting resolution, aspect ratio, and/or color profile for associated with a characteristics of a virtual display, or a derivative thereof). In some embodiments, the rendered content may then be resampled, scaled, and/or its color profile translated for display on attached displays (e.g., without re-rendering the image content). The computer may remember preferred display settings for a specific virtual display and/or combination of virtual and physical displays and may re-use those settings when that same virtual display or combination of virtual and physical displays is subsequently requested.

Example Configurations

FIG. 1 is a block diagram illustrating one embodiment of a computer system having multiple displays, both physically attached and not physically attached. Computer system 100 includes computing device 110, which may be any suitable type of computing device. In one embodiment, device 110 is a computing device with an integrated monitor, labeled as display 120. In some embodiments, display 120 is a display device integrated or internal to computing device 110. In some of the examples described herein, this display may be referred to as the "primary" display device of device 110, and is physically connected to other components of computing device 110. In some embodiments, primary display 120 may be physically connected to device 110 through an external interface. Display 120 is represented with a dotted line in FIG. 1 to indicate that it may be located either internal or external to device 110. Note that in some examples described herein, the primary display device (i.e., the main or default display for a computing device 110) may be referred to as the "internal" display, regardless of whether it is actually integrated within the computing device or is physically connected to the computing device through an external interface. As used herein, the term "display" may refer to any device that is configured to present a visual image in response to control signals being provided to the display. A variety of technologies may be used in the display, such as cathode ray tube (CRT), thin film transistor (TFT), liquid crystal display (LCD), light emitting diode (LED), plasma, etc. A display may also include touch screen input functionality, or projection capability, in some embodiments. The display devices may also be referred to as panels, in some cases.

In the example illustrated in FIG. 1, in addition to display 120, computing device 110 includes an external interface 130 that is physically coupled to an "external" or "secondary" display 160 via connection 150. Interface 130 may be any type of standard or proprietary wired interface. A given interface 130 can be understood to have a "data width" (e.g., a number of pins) that dictates how much data the interface can transfer at one time. In FIG. 1, connection 150 is a logical representation of the connection between device 110 and secondary display 160. In some embodiments, connection 150 may include one or more intervening hardware components. Like primary display 120, secondary display 160 may be any suitable type of device. For example, in some embodiments, secondary display 160 may be a high-definition TV (HDTV) compatible device or a projection device. As described in more detail herein, an internal (or primary) display or an external (or secondary) display may at various times be the "preferred" display for a computing device 100 (i.e., the device on which the user would like image content to be displayed in a best display mode for that display).

Figure 11:
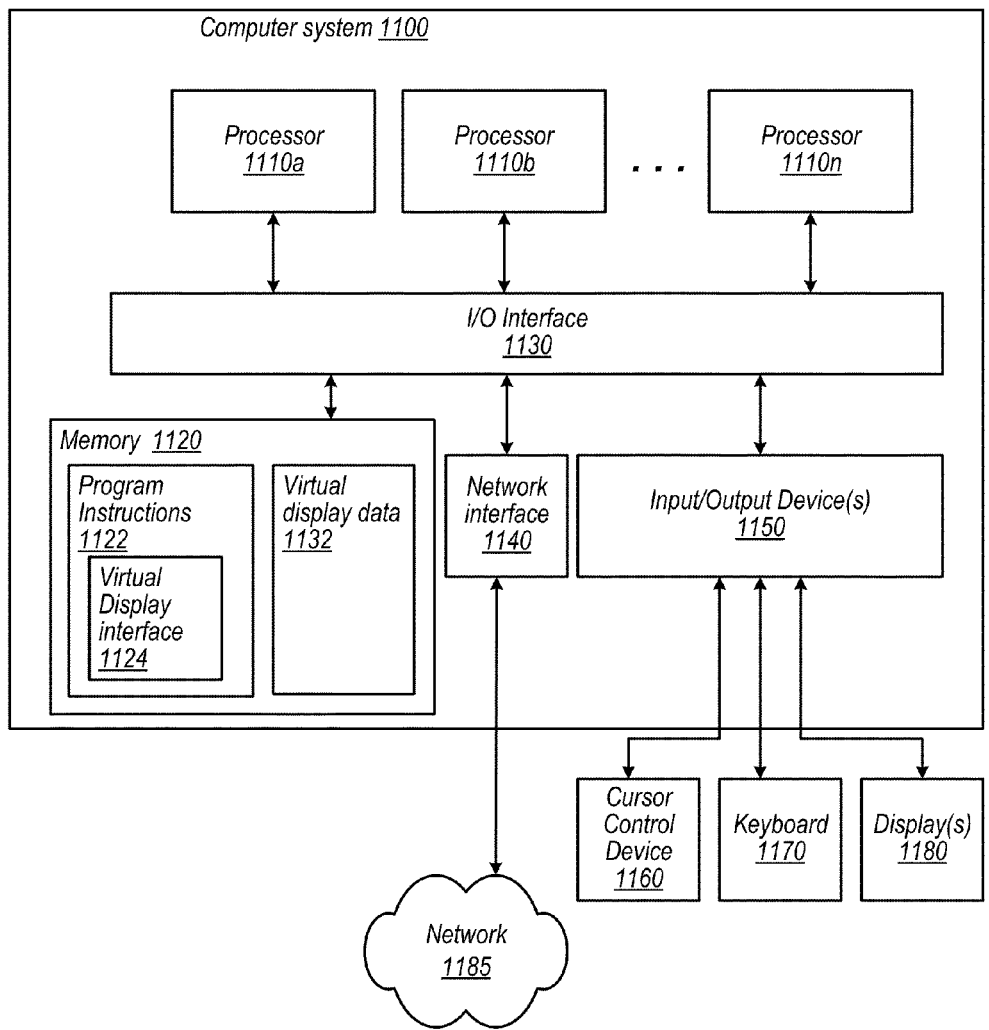
FIG. 11 illustrates an example computer system configured to implement display mirroring, according to various embodiments.

Computing device 110 may include various structures (not depicted in FIG. 1) that are common to many computing devices. These structures may include one or more processors, memories, graphics circuitry, I/O devices, bus controllers, etc. One embodiment of such a computing device is illustrated in FIG. 11 and described in detail below.

In the example illustrated in FIG. 1, in addition to physically connected displays 120 and 160, computing device 110 communicates display data to an external display 190, which is not physically connected to computing device 110, using radio frequency signals 142 transmitted from a transmitter 172 connected to an external interface 170 via connection 180. Interface 170 may be any type of standard or proprietary wired interface. A given interface 170 can be understood to have a "data width" (e.g., a number of pins) that dictates how much data the interface can transfer at one time. In FIG. 1, connection 180 is a logical representation of the connection between device 110 and transmitter 172. In some embodiments, connection 180 may include one or more intervening hardware components. Like primary display 120, external display 190 may be any suitable type of device. For example, in some embodiments, external display 190 may be a high-definition TV (HDTV) compatible device or a projection device.

In the example illustrated in FIG. 1, in addition to physically connected displays 120 and 160, computing device 110 communicates display data to a remote external display 192, which is not physically connected to computing device 110, using a network 102 to communicate with a remote computing device 112 to which remote external display 192 is connected.

In some embodiments, one or more processors on computing device 110 create, using an operating system, one or more display interfaces, which are software components used for communicating with display devices, such as display 120 and external display 160. The display interfaces are interfaces for communication of display data and user input events between an application layer for applications executing on computing device 110 and the one or more display devices. Each of the one or more display devices, such as display 120 and external display 160, is physically connected to a computing system, such as computing device 110, managed by the operating system. The operating system of computing device 110 also creates one or more virtual display interfaces for communication of display data and user input events between the application layer and one or more virtual display devices, which include storage and communication systems for managing one or more virtual display devices that are not physically connected to the computing system, such as computing device 110, managed by the operating system.

Computing device 110 executes one or more applications in an application layer. At least one of the one or more applications communicates display data to and receives user input events from at least one of the one or more display devices using at least one of the display interfaces, such as display 120 and external display 160, and at least one other of the one or more applications communicates display data to and receives user input events from at least one of the one or more virtual display devices using at least one of the one or more virtual display interfaces. In some embodiments, the virtual display interface is a data construct used for transmitting, e.g., through transmitter 172, the display data from the at least one other of the one or more applications to a target virtual display device, e.g., external display 190, over a radio frequency connection, e.g., radio frequency signals 142. In some embodiments, the virtual display interface is used for transmitting the display data from the at least one other of the one or more applications to a remote computing system, e.g., remote computing device 112 housing (or otherwise connected to) a target virtual display device, e.g., remote external display 192 over a network connection, e.g., network 102. In some embodiments, computing device 110 performs verifying a permission of a remote computing system, remote computing device 112, housing (or otherwise connected to) a target display device, e.g., remote external display 192, to display the display data, and performs transmitting the display data from the at least one other of the one or more applications to a remote computing system, e.g., remote computing device 112 housing (or otherwise connected to) a target virtual display device, e.g., remote external display 192 over a network connection, e.g., network 102.

Some embodiments perform generating, using a processor of computing device 110, output of the at least one other application for communication to the at least one of the one or more virtual display devices, and rendering from the output of the at least one other application, using hardware acceleration provided by a graphics processing unit of computing device 110, display data for display on the virtual display device. In various embodiments, computing device 110 may operate to generate display frames of data. Generally, a frame is data describing an image to be displayed. A frame may include pixel data describing the pixels included in the frame (e.g. in terms of various color spaces, such as RGB or YCrCb), and may also include metadata such as an alpha value for blending. Static frames may be frames that are not part of a video sequence. Alternatively, video frames may be frames in a video sequence. Each frame in the video sequence may be displayed after the preceding frame, at a rate specified for the video sequence (e.g. 15-30 frames a second). Video frames may also be complete images, or may be compressed images that refer to other images in the sequence. If the frames are compressed, a video pipeline in device 110 may decompress the frames.

In some embodiments, display generation unit within device 110 may be configured to generate (i.e. render), fetch, and/or process frame data to provide a stream of pixel values for display. The display generation unit may be configured as a display pipeline in some embodiments. Additionally, the display generation unit may be configured to blend multiple frames to produce an output frame. For example, in one embodiment, each frame pixel may have an associated alpha value indicating its opaqueness.

Generally, a pixel value in a stream of pixel values may be a representation of a pixel to be displayed on a display coupled to device 110. The pixel value may include a one or more color space values. For example, in an RGB color space, the pixel value includes a red value, a green value, and a blue value. Each value may range from zero to $2^N-1$, and describes an intensity of the color for that pixel. Similarly, in the YCrCb color space, the pixel value includes a Y value, a Cr value, and a Cb value. The location of a pixel on the display may be inferred from the position of the corresponding pixel value in the pixel stream. For example, the pixel stream may be a series of rows of pixels, each row forming a line on the display screen. In a progressive-mode display, the lines are drawn in consecutive order and thus the next line in the pixel stream is immediately adjacent to the previous line. In an interlaced-mode display, consecutive passes over the display draw either the even or the odd lines, and thus the next line in the pixel stream skips one line from the previous line in the pixel stream. For brevity, the stream of pixel values may be referred to as a pixel stream, or a stream of pixels. Pixel processing units within device 110 may be configured to perform various pixel operations on the pixel stream and may provide the processed pixel stream to the respective physical interfaces (PHYs), or display drivers. For example, pixel operations may include one or more of: color space conversions, backlight control, gamma correction, contrast ratio improvement, filtering, dithering, etc. The PHYs may generally include the circuitry that physically controls the corresponding displays. The PHYs may drive control signals that physically control the respective display panels in response to the pixel values. Thus, for example, a PHY for a display that is controlled by RGB signals may transmit voltages on the R, G, and B signals that correspond to the R, G, and B components of the pixel. There may also be a display clock that may be transmitted by the PHYs, or the display clock may be embedded in one of the control signals. Different PHYs for different displays may have clocks that are within different clock domains.

Figure 2:
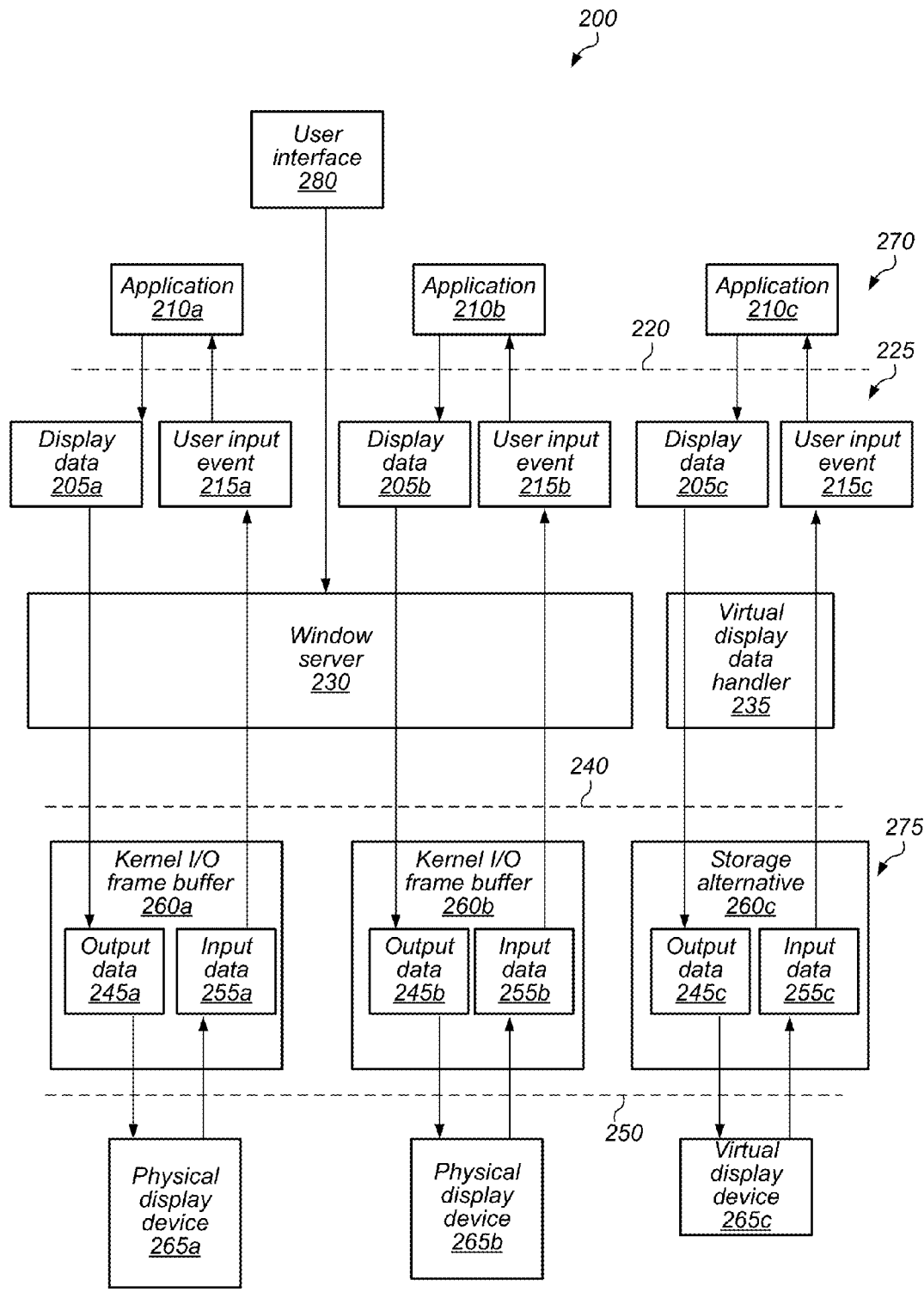
FIG. 2 is a block diagram illustrating software modules for one embodiment of a computer system that includes physical and virtual displays.

FIG. 2 is a block diagram illustrating software modules for one embodiment of a computer system that includes physical and virtual displays. Within a computer system 200 with one or more processors, several applications 210a-201b execute in an application layer 270. These applications interact with the computer system 200 through the intervention of an operating system 225, and an operating system layer of a computing stack exists between demarcations 220 and 240. A physical layer 275 of the computing stack exists between demarcations 250 and 240. A window server 230 handles display data 205a-205b and user event data 215a-215b, for applications 210a-210b. In some embodiments, window server 230 is an internal construct of operating system 225 and applications 201a-210b communicate with window server 230 using APIs (not shown). Window server 230 communicates output data 245a-245b to and receives input data 255a-255b from kernel I/O frame buffers 260a-260b, where it is routed to physical display devices 265a-265b over physical connections.

A virtual display data handler 235 handles display data 205c and user event data 215c, for application 210c. In some embodiments, virtual display data handler 235 is an internal construct of operating system 225 and application 201c communicates with virtual display data handler 235 using APIs (not shown). Virtual display data handler 235 communicates output data 245c to and receives input data 255c from a storage alternative 260c, where it may be routed to a virtual display devices 265c as discussed herein.

Operating system 225 creates one or more display interfaces by designating I/O frame buffers 260a-260b. The one or more display interfaces (e.g., I/O frame buffers 260a-260b) are interfaces for communication of display data 205a-205b and user input events 215a-215b between an application layer 270 and one or more display devices, e.g., physical display devices 265a-265b, each of which is physically connected to a computing system managed by the operating system. Operating system 225 creates one or more virtual display interfaces, such as storage alternative 260c, for communication of display data 205c and user input events 215c between the application layer 270 and one or more virtual display devices 265c. The one or more virtual display devices 265c are not physically connected to the computing system managed by the operating system 226. One or more applications 210a-210c execute in the application layer 270. At least one of the one or more applications 210a-210b communicates display data 205a-205b to and receives user input events 215a-215b from at least one of the one or more display devices 265a-265b using at least one of the display interfaces 260a-260b. At least one other of the one or more applications 210c communicates display data 205c to and receives user input events 215c from at least one of the one or more virtual display devices 265c using at least one of the one or more virtual display interfaces 260c. In some embodiments, display interfaces 260c are virtual I/O frame buffers.

In some embodiments, configuration of virtual display interface 260c to support virtual display device 265c is performed at user request through a user interface 280 for window server or another operating system component. The user interface 280 may be used to designate a remote device (e.g. remote external display 192 or external display 190 of FIG. 1) as virtual display device 265c and associate the remote device with virtual display interface 260c, as well as configure parameters of virtual display device 265c.

In some embodiments, user interface 280 may be used to initiate communication with a remote device (e.g. remote external display 192 or external display 190 of FIG. 1) to obtain extended display identification data (EDID) from the physical display device itself, which may include manufacturing information, model and/or serial numbers, display parameter values for supported display modes, and/or other consumer electronics profile information. Such information may be provided by various consumer electronics devices automatically (e.g., upon boot-up, during system initialization, or when it is attached in the system), or in response to being polled for this information by the system, in different embodiments. In some embodiments, such information is manually entered through user interface 280. Rather than merely mirroring on one display what is done on another, some embodiments support virtual displays with no physical embodiment.

Note that in addition to the information provided in all EDID blocks, there are various extensions to the standard that have been proposed (and in some cases largely adopted) over time. For example, most television manufacturers have implemented an extension referred to herein as a CEA-861 extension block, which includes information indicating a preferred video mode. In some cases, the preferred video mode may not be the highest-resolution mode advertised for (or supported by) a given device. For example, while a manufacturer may advertise that a particular television has the capability of supporting 1080 vertical pixels, the television may actually implement only 720 vertical pixels. Therefore, the preferred mode (which may be used as the best mode or the default mode for a television by the techniques described herein) may be the 720p mode. Images rendered according to this mode may look better on the television that images rendered in 1080p mode, because 720p is the native resolution of the television, and images rendered at this resolution would not require any scaling. Virtual display handler 235 may automatically select such configuration options or may allow user selection through user interface 290.

In some cases, the EDID codes supplied by some devices are misleading or incorrect. For example, some LCD panels that have speakers but that are not televisions may advertise audio timings but not video timings in their EDID blocks, and may need to be treated as "not televisions". In some embodiments, the computer may examine the advertised size of a display (which may be included in a CEA extension block with its physical width and height being specified in millimeters). If the size is something reasonably large (e.g., significantly larger than 12 inches on the diagonal, such as 30 inches or more) the computer may assume with near certainty that the display is a television (or another large presentation display), rather than a display that would sit on the desk next to the computer as a monitor.

Note that for projectors, a standard policy is to report a width and height of zero mm, since there is no physical size associated with an image being projected. However, various projector manufacturers have incorrectly interpreted this policy to mean they should their aspect ratio (e.g., 16 mm×9 mm) should be reported in place of the width and height. In some embodiments, the computer may detect this error and assume that the display is a projector.

In some embodiments, the system may maintain a database or list of device identifiers for which one or more of the EDID codes supplied by the devices are known to be incorrect. In such embodiments, the information provided by a display device may be compared against the database or list to determine whether substitute or override parameter values (e.g., values stored in the database or list) should be used to determine the type of the display, rather than those provided by the device itself. Such a database may be stored locally in the system or may be accessible to the system over a network, and may be updated periodically or on an as-needed basis when information provided by a display device is found to be incorrect.

In some embodiments, once the preferred display mode and preferred display are determined, the computer may be configured to render images for display in a best (or preferred) mode of the preferred display and to scale and/or translated the rendered images for display on one or more physical displays device (e.g. remote external display 192 or external display 190 of FIG. 1, or, alternatively, displays 325 and 365 of FIG. 3, discussed below). This may involve determining (e.g., based on EDID codes and/or on other stored or recently obtained information) a native, best-supported, default, or previously selected resolution, aspect ratio, color profile, size (e.g., height and width in pixels), bit depth (e.g., 16-bit or 30-bit mode), and/or rotation for the selected display, in some embodiments. Note that in some cases, if the user wishes to display a presentation for which the user has only low-resolution image data, the computer may or may not scale the images up to the best mode resolution for the selected display (e.g., depending on the application that is being used to present the images). For example, the images may appear best if they are not upscaled to fill the screen, but are displayed according to their native (low) resolution.

In some embodiments, the method may include determining the best display mode parameters for each of the physical and virtual displays based, at least in part, on information received in an EDID block from the displays themselves, and/or on known information about these types of displays (e.g., information stored in one or more databases of display parameter values and/or display override parameters).

As described herein, resampling of rendered image data for display of a virtual image display data on a physical display may include up-sampling or down-sampling the rendered image data, depending on the resolutions and aspect ratios of the particular internal and external displays. In some embodiments, the method may also include translating the color profile of the rendered image data for display on the non-preferred display(s) dependent on the color profile(s) of the non-preferred display(s).

In some embodiments, the logical functions described herein for determining the types of displays connected in a computing system, determining a display mode, and/or determining a preferred display may be performed by virtual display handler 235. For example, they may be performed every time a virtual display is attached to or detached from the system through user interface 280, any time a user manually inputs some display mode information to the system (e.g., various display preferences input through one or more user interface mechanisms), or when a virtual display comes into and goes out of contact with virtual display handler 235. In some embodiments, the system may remember the automatically determined and/or user-defined selections.

As previously noted, in some embodiments, the systems described herein may allow a user to override the decisions made automatically by the system. For example, in some embodiments, when a remote external display is associated with a computer as a virtual display device, a "display extras" menu may be displayed (e.g., as a pop-up), and the user may be able to select this menu (e.g., by "mousing over it") to modify one or more of automatically determined choices (e.g., the display mode, the preferred display, and/or one or more display parameters thereof). In some such embodiments, instead of presenting the user with every possible mode that the system can physically display, the system may provide the user with the option to select the best mode for a particular display, or to select one of a set of scaled modes. These scaled modes may be expressed as a set of point sizes that will then be scaled to fit on the display, and they may be labeled in such a way that expresses to the user what is likely to happen on the system (e.g., "largest text" or "most pixels"). In various embodiments, details of the physical workings of the display system (e.g., vertical blanking time) may be abstracted away from the user. Note that for a laptop computer, the system may express display options in terms of points (rather than pixels) because that is how users are used to interpreting the dimensions of their screens. For television, the system may express display options as a set of TV-like resolutions (e.g., 1080p, 1080i, or 720p, rather than 800×600 or 1280×720). For computer monitors, the system may express display options in terms of horizontal and vertical pixels (e.g., 2048×1536).

Note that in some embodiments, a computer may send out display re-configure notifications when (or immediately prior to) making a change in the display configuration for the computer and its attached displays. In general, the system (or a policy engine thereof) may attempt to figure out what the intended display configuration is, whether the user has a preference, how the color should be managed, etc., and then may provide software running on the system a notification of the pending configuration. In such embodiments, an application that manages presentations or movie playback may listen to the display re-configure notification that goes out on the system and reply with a request to override one or more of the automatically determined choices (e.g., the preferred display, or the resolution of the preferred display). In response, the computer may make the requested modification. Similarly, a display re-configure notification may be sent out in response to a user selecting a change in a display preference (e.g., through one of various user interface mechanisms). In some embodiments, a display re-configure notification may be sent out to provide advance notice of a proposed or pending change, and/or a display re-configure notification may be sent out subsequent to making a display configuration change to indicate that the change has been made. In some embodiments and in some cases, an application that is currently executing in the system may reject a pending display configuration change, in response to which the computer may delay, modify, or abort the pending change. In other cases, currently executing applications may react to a completed display configuration change (e.g., to take advantage of the completed change by resizing the images it produces, or by migrating from a low-power graphics card to a high-power graphics card or vice versa), or may ignore (or be oblivious to) a pending or completed change. In some embodiments, applications that are interested in receiving such notifications may register to receive them. In other embodiments, the operating system and/or various functions of a system library may be registered to receive such notifications and to resize images produced by various executing applications on their behalf. Various other types of responses to notifications of pending and/or complete display configuration changes may be performed, in other embodiments.

Figure 3:
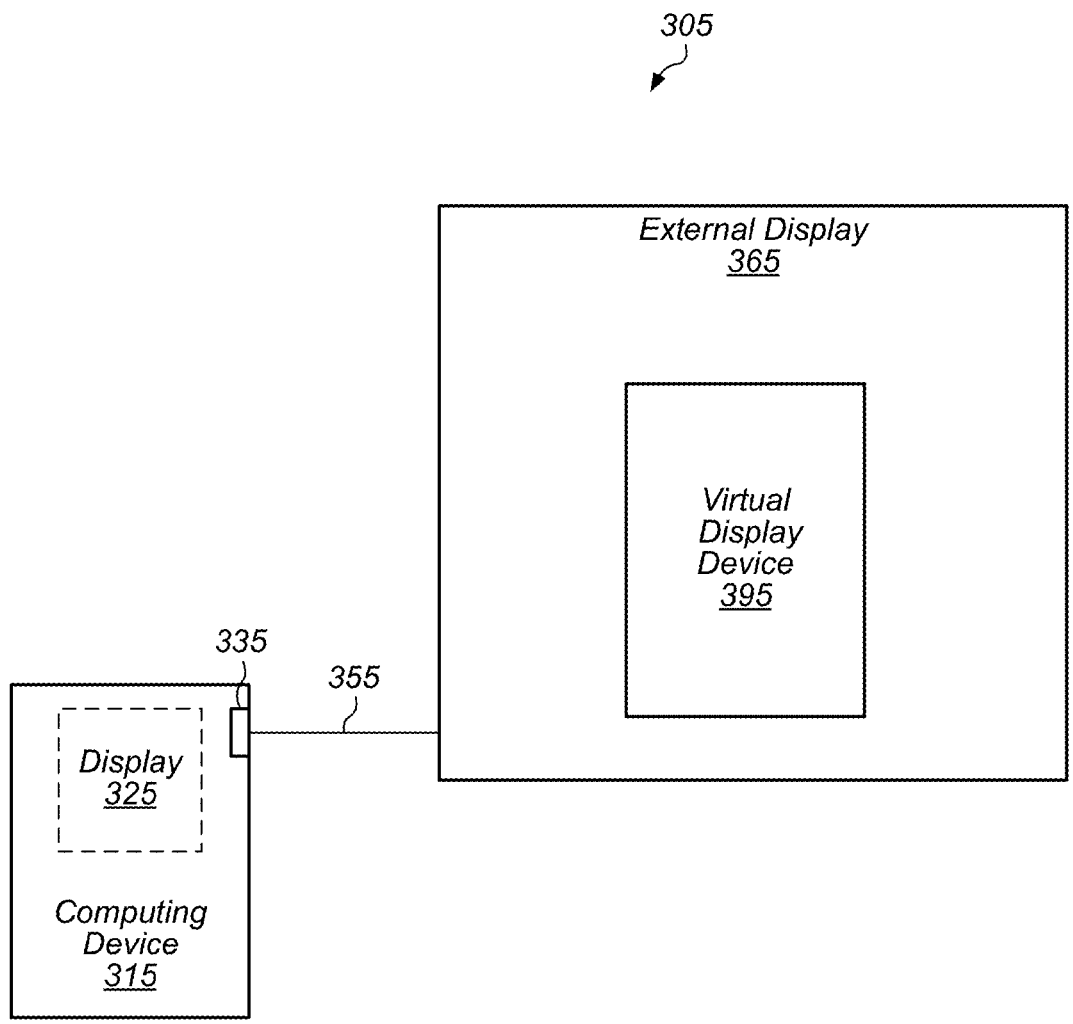
FIG. 3 is a block diagram illustrating one embodiment of a computer system having multiple displays, both physically attached and virtual.

FIG. 3 is a block diagram illustrating one embodiment of a computer system having multiple displays, both physically attached and virtual. Computer system 305 includes computing device 315, which may be any suitable type of computing device. In one embodiment, device 315 is a computing device with an integrated monitor, labeled as display 325. In some embodiments, display 325 is a display device integrated or internal to computing device 315. In some of the examples described herein, this display may be referred to as the "primary" display device of device 315, and is physically connected to other components of computing device 315. In some embodiments, primary display 325 may be physically connected to device 315 through an external interface. Display 325 is represented with a dotted line in FIG. 3 to indicate that it may be located either internal or external to device 315. Note that in some examples described herein, the primary display device (i.e., the main or default display for a computing device 315) may be referred to as the "internal" display, regardless of whether it is actually integrated within the computing device or is physically connected to the computing device through an external interface. As used herein, the term "display" may refer to any device that is configured to present a visual image in response to control signals being provided to the display. A variety of technologies may be used in the display, such as cathode ray tube (CRT), thin film transistor (TFT), liquid crystal display (LCD), light emitting diode (LED), plasma, etc. A display may also include touch screen input functionality, or projection capability, in some embodiments. The display devices may also be referred to as panels, in some cases.

In the example illustrated in FIG. 3, in addition to display 325, computing device 315 includes an external interface 335 that is physically coupled to an "external" or "secondary" display 365 via connection 355. Interface 335 may be any type of standard or proprietary wired interface. A given interface 335 can be understood to have a "data width" (e.g., a number of pins) that dictates how much data the interface can transfer at one time. In FIG. 3, connection 355 is a logical representation of the connection between device 315 and secondary display 365. In some embodiments, connection 355 may include one or more intervening hardware components. Like primary display 325, secondary display 365 may be any suitable type of device. For example, in some embodiments, secondary display 365 may be a high-definition TV (HDTV) compatible device or a projection device. As described in more detail herein, an internal (or primary) display or an external (or secondary) display may at various times be the "preferred" display for a computing device 305 (i.e., the device on which the user would like image content to be displayed in a best display mode for that display).

In some embodiments, one or more processors on computing device 315 create, using an operating system, one or more display interfaces, which are software components used for communicating with display devices, such as display 325 and external display 365. The display interfaces are interfaces for communication of display data and user input events between an application layer for applications executing on computing device 315 and the one or more display devices. Each of the one or more display devices, such as display 325 and external display 365, is physically connected to a computing system, such as computing device 315, managed by the operating system. The operating system of computing device 315 also creates one or more virtual display interfaces for communication of display data and user input events between the application layer and one or more virtual display devices, which include storage and communication systems for managing one or more virtual display devices that are not physically connected to the computing system, such as computing device 315, managed by the operating system.

Computing device 315 executes one or more applications in the application layer. At least one of the one or more applications communicates display data to and receives user input events from at least one of the one or more display devices using at least one of the display interfaces, such as display 325 and external display 365, and at least one other of the one or more applications communicates display data to and receives user input events from at least one of the one or more virtual display devices using at least one of the one or more virtual display interfaces.

Some embodiments perform generating, using a processor of computing device 315, output representing attributes of a window. The window displays the interactive elements of a graphical user interface on at least one of the one or more virtual display devices using at least one of the virtual display interfaces in a simulation of a virtual display. Computing device 315 performs rendering, using the hardware acceleration provided by the graphics processing unit, the output for display on the one or more virtual display devices, for example as the display frames discussed above, and displaying, on the at least one of the plurality of display devices using at least one of the display interfaces, the output for display on the one or more virtual display devices. In some embodiments, this allows simulation of rendering of video information for a virtual display 395, which is a presentation of output rendered for display on virtual display device 395 with attributes (e.g., those attributes listed above) different from those of available on an attached display (e.g., displays 325, 365). In some embodiments, virtual display device 395 is a software-only device presented on external display 365.

In this way, rendering with display parameters not available on attached displays of a machine may be performed on the machine and sampling or other simulation of an image may be performed to display the image on an attached display (e.g., displays 325, 365). This solution may involve rendering image and utilizing a scaling unit or display drivers to resample or otherwise scale the rendered image data for presentation on a display other than the one for which it was rendered. In other words, the images may be automatically rendered in a best or preferred mode for display on the virtual display device (e.g., using a GPU or other available computing facilities), and may be resampled or otherwise scaled (without being re-rendered) for display on the internal or primary display of the computer. In various embodiments, any one of a variety of different filters may be applied to down-sample the rendered image content, e.g., a bi-linear filter may be applied. In some embodiments, the system may adjust the rendered image content for differences in aspect ratios. For example, it may attempt to maintain square pixels on the output, rather than just stretching and/or compressing the image in one or more directions so that it will fit the other display. Therefore, depending on the aspect ratios of the preferred and non-preferred displays, there may be "black bars" visible across the top (and/or bottom), of the non-preferred display, or down the sides of the non-preferred display, or they may be a perfect match (e.g., if the two display have the same aspect ratios).

Some embodiments perform generating, using a processor of computing device 310, output representing attributes of a window. The window displays the interactive elements of a graphical user interface on at least one of the one or more virtual display devices using at least one of the virtual display interfaces in a simulation of a virtual display. Computing device 315 performs rendering, using the hardware acceleration provided by the graphics processing unit, the output for display on the one or more virtual display devices, for example as the display frames discussed above, and displaying, on the at least one of the plurality of display devices using at least one of the display interfaces, the output for display on the one or more virtual display devices. In some embodiments, this allows simulation of rendering of video information for a virtual display with attributes (e.g., those attributes listed above) different from those of available on an attached display (e.g., displays 325, 365) and performance of comparing to expected values the output for display on the one or more virtual display devices to appraise display performance.

Note that there may also be a variety of methods for implementing the display mirroring itself, in different embodiments. For example, in one embodiment in which two displays have the same resolution, there may be two different display heads in the hardware, but they may reference the same memory, and each may scan out from that memory to a respective one of the displays. In another embodiment in which the display panels are different sizes (i.e., when they have a different numbers of pixels), there may be a hardware scaling unit that can scale the image on the fly. Note that multiple GPU vendors provide some type of panel fitter that can perform some amount of up-scaling or down-scaling, any of which may be employed in the systems described herein. In general, it may be left up to any available GPU drivers to perform the rescaling of the rendered image content for use on other displays. In some embodiments, the GPU may be given a list of rectangles when part of the screen is redrawn to them it know what has actually changed. In such embodiments, the GPU may not need to continuously resample the entire image for every single frame, which may improve performance and/or save battery life.

Example Methods

Various embodiments of systems and methods for implementing and using virtual display devices and virtual display interfaces may include methods that may be performed on one or more computers (such as computer system 1100 illustrated in FIG. 11 below), including portable electronic devices. FIGS. 4-10 illustrate various examples of such methods.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The descriptions included herein are intended to cover such alternatives, modifications, and equivalents as would be apparent to a person skilled in the art having the benefit of this disclosure.

Figure 4:
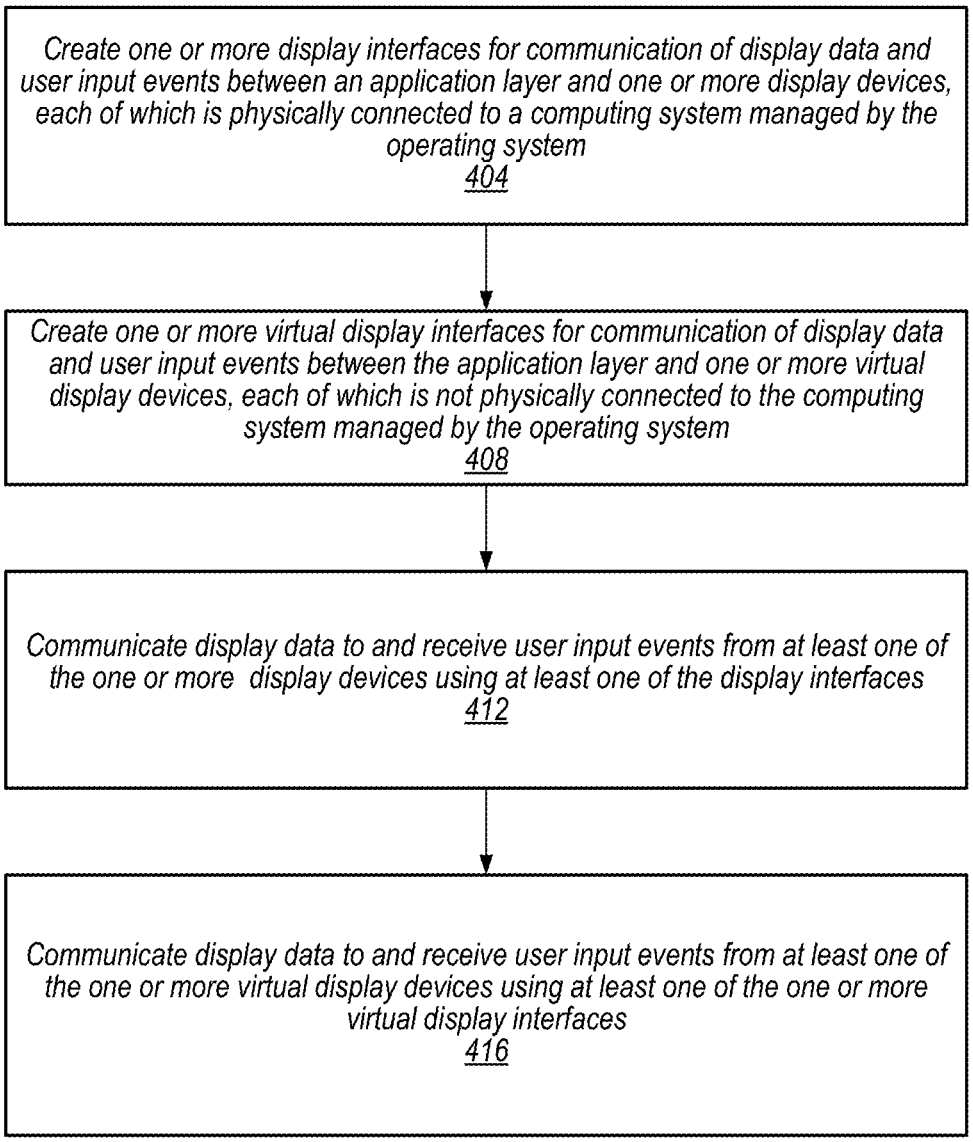
FIG. 4 is a flow diagram illustrating one embodiment of a method for using virtual displays.

FIG. 4 is a flow diagram illustrating one embodiment of a method for using virtual displays. One or more display interfaces for communication of display data and user input events between an application layer and one or more display devices, each of which is physically connected to a computing system managed by the operating system are created (block 404). One or more virtual display interfaces for communication of display data and user input events between the application layer and one or more virtual display devices, each of which is not physically connected to the computing system managed by the operating system are created (block 408).

Display data is communicated to and user input events are received from at least one of the one or more display devices using at least one of the display interfaces (block 412). Display data is communicated to and user input events are received from at least one of the one or more virtual display devices using at least one of the one or more virtual display interfaces (block 416).

Figure 5:
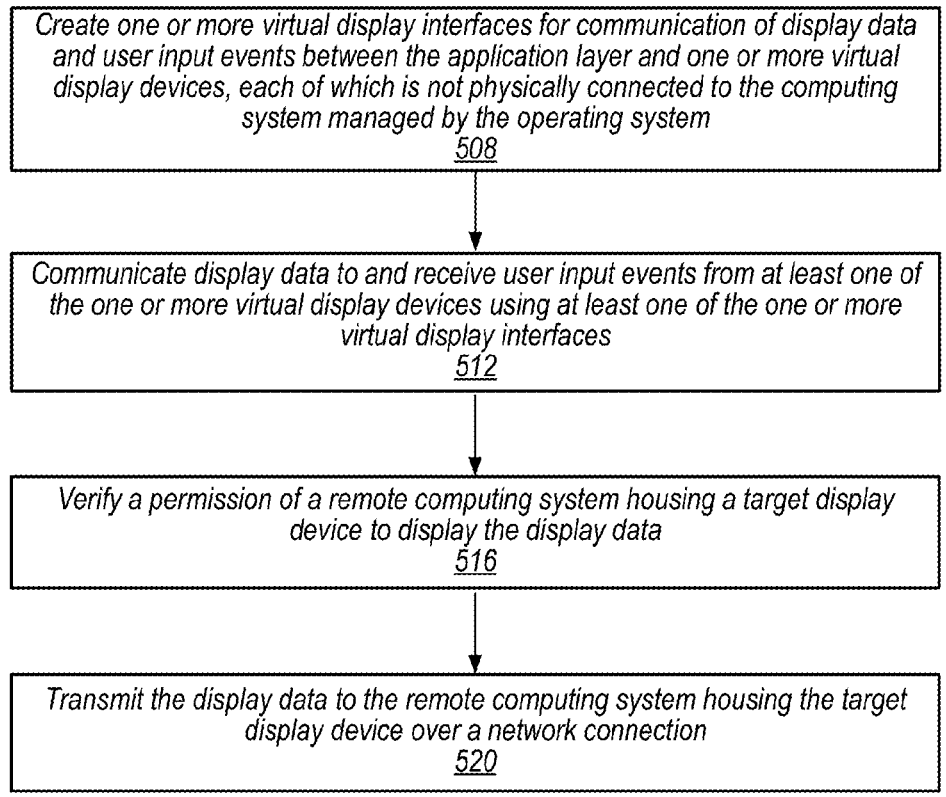
FIG. 5 is a flow diagram illustrating one embodiment of a method for using virtual displays with digital rights management.

FIG. 5 is a flow diagram illustrating one embodiment of a method for using virtual displays with digital rights management. One or more virtual display interfaces for communication of display data and user input events between the application layer and one or more virtual display devices, each of which is not physically connected to the computing system managed by the operating system are created (block 508). Display data is communicated to and user input events are received from at least one of the one or more virtual display devices using at least one of the one or more virtual display interfaces (block 512). A permission of a remote computing system housing a target display device to display the display data is verified (block 516). The display data is transmitted to the remote computing system housing the target display device over a network connection (block 520).

Figure 6:
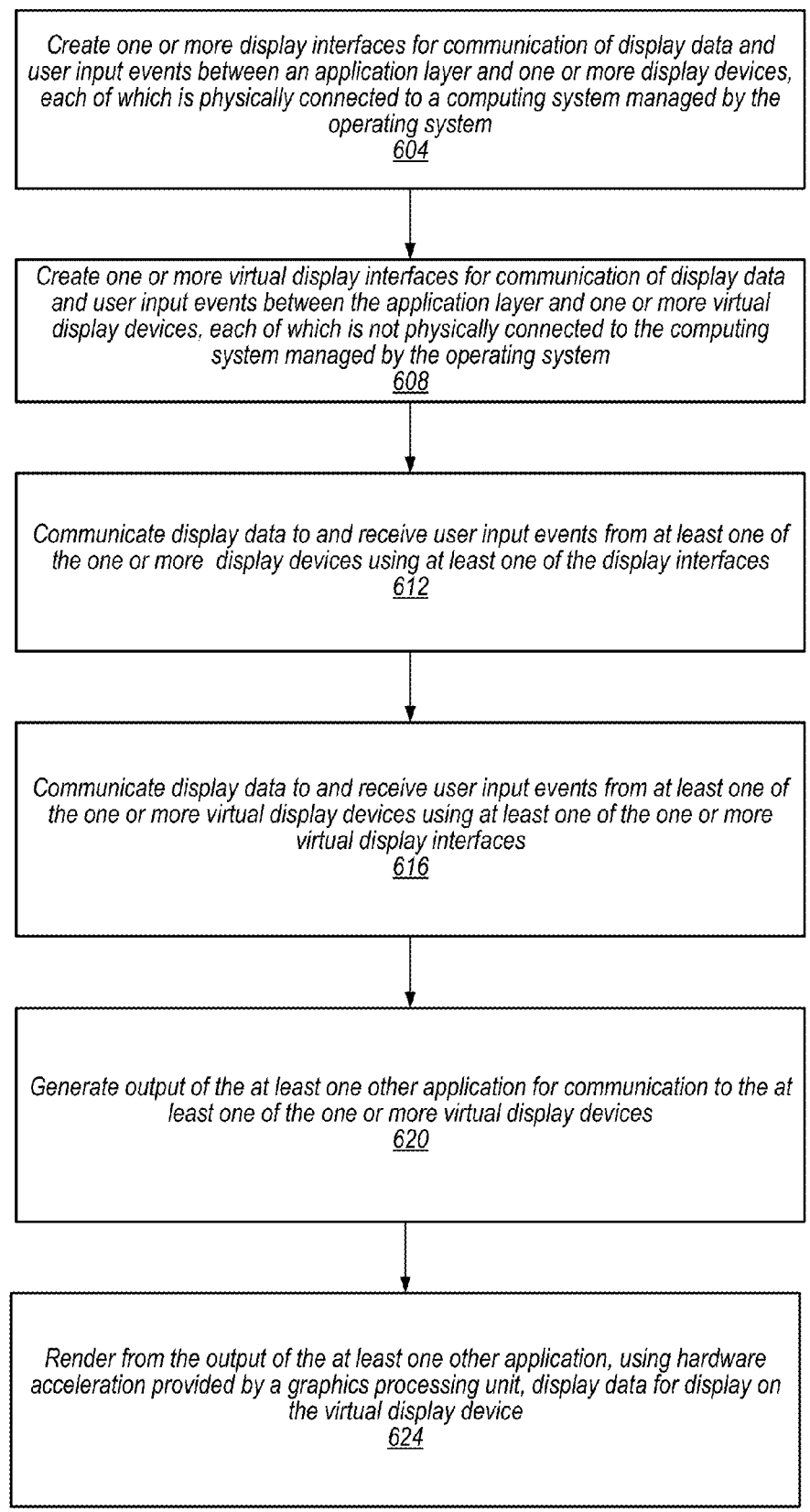
FIG. 6 is a flow diagram illustrating one embodiment of a method for using virtual displays with hardware acceleration.

FIG. 6 is a flow diagram illustrating one embodiment of a method for using virtual displays with hardware acceleration. One or more display interfaces for communication of display data and user input events between an application layer and one or more display devices, each of which is physically connected to a computing system managed by the operating system are created (block 604). One or more virtual display interfaces for communication of display data and user input events between the application layer and one or more virtual display devices, each of which is not physically connected to the computing system managed by the operating system are created (block 608).

Display data is communicated to and user input events are received from at least one of the one or more display devices using at least one of the display interfaces (block 612). Display data is communicated to and user input events are received from at least one of the one or more virtual display devices using at least one of the one or more virtual display interfaces (block 616). Output of at least one other application for communication to the at least one of the one or more virtual display devices (block 620). Using hardware acceleration provided by a graphics processing unit, display data for display on the virtual display device is rendered from the output of the at least one other application (block 624).

Figure 7:
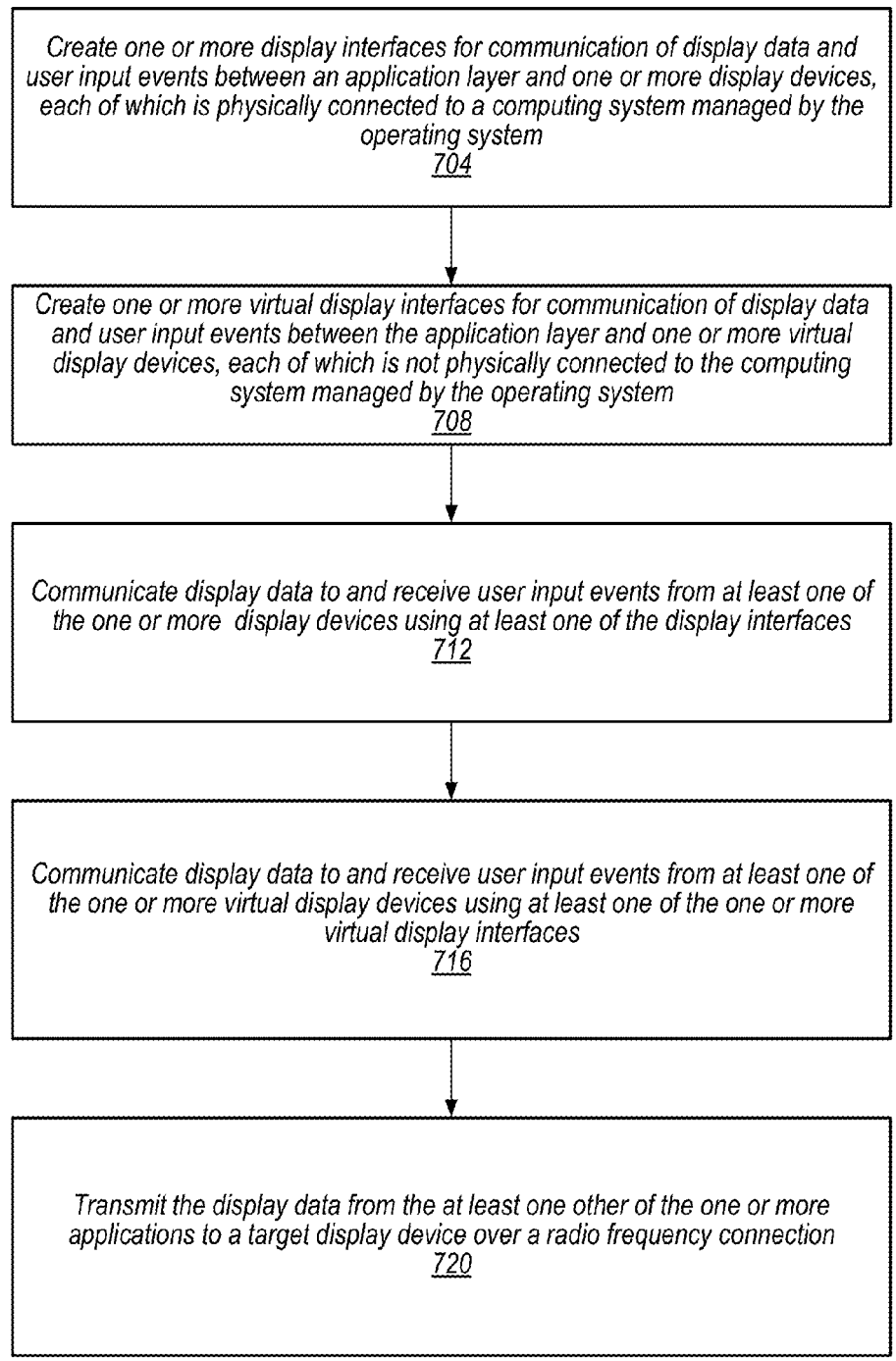
FIG. 7 is a flow diagram illustrating one embodiment of a method for using virtual displays with wireless transmission.

FIG. 7 is a flow diagram illustrating one embodiment of a method for using virtual displays with wireless transmission. One or more display interfaces for communication of display data and user input events between an application layer and one or more display devices, each of which is physically connected to a computing system managed by the operating system are created (block 704). One or more virtual display interfaces for communication of display data and user input events between the application layer and one or more virtual display devices, each of which is not physically connected to the computing system managed by the operating system are created (block 708).

Display data is communicated to and user input events are received from at least one of the one or more display devices using at least one of the display interfaces (block 712). Display data is communicated to and user input events are received from at least one of the one or more virtual display devices using at least one of the one or more virtual display interfaces (block 716). The display data is transmitted from the at least one other of the one or more applications to a target display device over a radio frequency connection (block 720).

FIG. 8 is a flow diagram illustrating one embodiment of a method for using virtual displays with network transmission One or more display interfaces for communication of display data and user input events between an application layer and one or more display devices, each of which is physically connected to a computing system managed by the operating system are created (block 804). One or more virtual display interfaces for communication of display data and user input events between the application layer and one or more virtual display devices, each of which is not physically connected to the computing system managed by the operating system are created (block 808).

Display data is communicated to and user input events are received from at least one of the one or more display devices using at least one of the display interfaces (block 812). Display data is communicated to and user input events are received from at least one of the one or more virtual display devices using at least one of the one or more virtual display interfaces (block 816). The display data is transmitted from the at least one other of the one or more applications to a remote computing system housing a target display device over a network connection (block 820).

Figure 9:
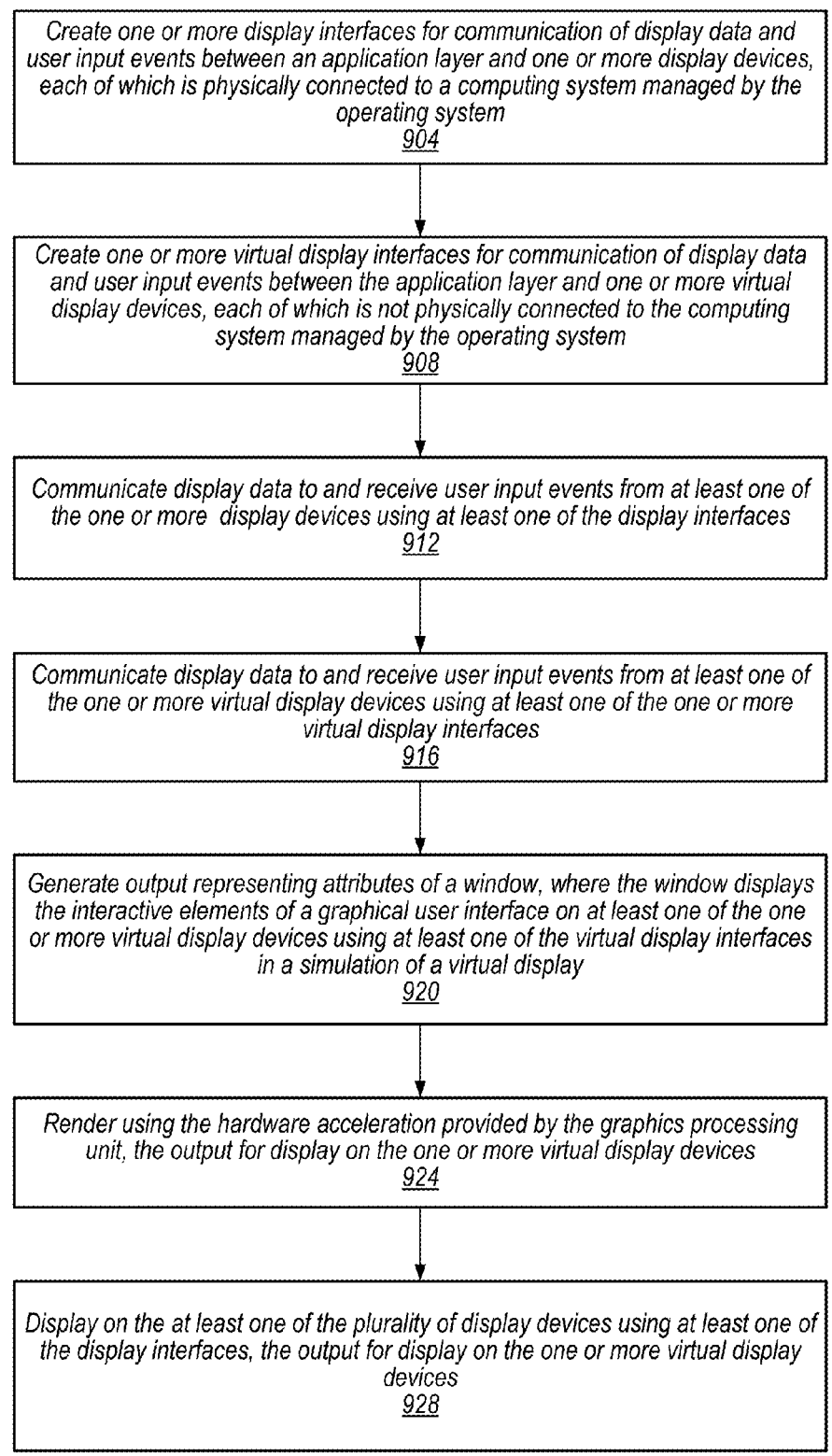
FIG. 9 is a flow diagram illustrating one embodiment of a method for using virtual displays with display on a physical device.

FIG. 9 is a flow diagram illustrating one embodiment of a method for using virtual displays with display on a physical device. One or more display interfaces for communication of display data and user input events between an application layer and one or more display devices, each of which is physically connected to a computing system managed by the operating system are created (block 904). One or more virtual display interfaces for communication of display data and user input events between the application layer and one or more virtual display devices, each of which is not physically connected to the computing system managed by the operating system are created (block 908).

Display data is communicated to and user input events are received from at least one of the one or more display devices using at least one of the display interfaces (block 912). Display data is communicated to and user input events are received from at least one of the one or more virtual display devices using at least one of the one or more virtual display interfaces (block 916). Output representing attributes of a window, where the window displays the interactive elements of a graphical user interface on at least one of the one or more virtual display devices using at least one of the virtual display interfaces in a simulation of a virtual display, is generated (block 920).

Using the hardware acceleration provided by the graphics processing unit, the output is rendered for display on the one or more virtual display devices (block 924). On the at least one of the plurality of display devices using at least one of the display interfaces, the output for display on the one or more virtual display devices is displayed (block 928).

Figure 10:
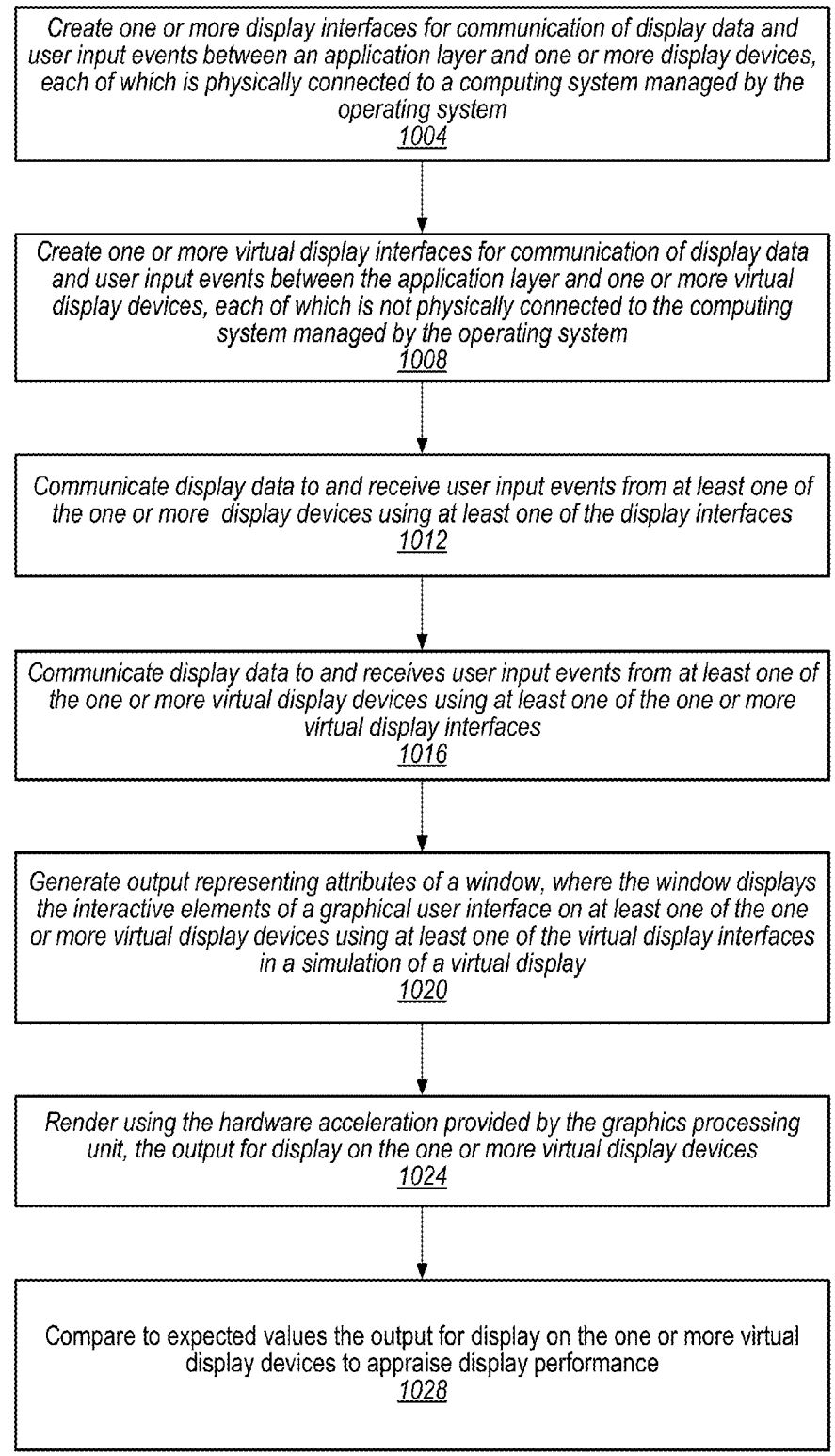
FIG. 10 is a flow diagram illustrating one embodiment of a method for using virtual displays with simulation.

FIG. 10 is a flow diagram illustrating one embodiment of a method for using virtual displays with simulation. One or more display interfaces for communication of display data and user input events between an application layer and one or more display devices, each of which is physically connected to a computing system managed by the operating system are created (block 1004). One or more virtual display interfaces for communication of display data and user input events between the application layer and one or more virtual display devices, each of which is not physically connected to the computing system managed by the operating system are created (block 1008).

Display data is communicated to and user input events are received from at least one of the one or more display devices using at least one of the display interfaces (block 1012). Display data is communicated to and user input events are received from at least one of the one or more virtual display devices using at least one of the one or more virtual display interfaces (block 1016). Output representing attributes of a window, where the window displays the interactive elements of a graphical user interface on at least one of the one or more virtual display devices using at least one of the virtual display interfaces in a simulation of a virtual display, is generated (block 1020). Using the hardware acceleration provided by the graphics processing unit, the output is rendered for display on the one or more virtual display devices (block 1024). The output for display on the one or more virtual display devices is compared to expected values to appraise display performance (block 1028).

The method may also include resampling and/or scaling the rendered content for display on the other display (i.e., the non-preferred display), and presenting the resampled and/or scaled image content on the external display.

Example Computer System

FIG. 11 illustrates computer system 1100 that is configured to implement any or all of the embodiments described above. In different embodiments, computer system 1100 may be any of various types of devices, including, but not limited to, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a system and method for implementing and using virtual display devices, as described herein, may be executed on one or more computer systems 1100, which may interact with various other devices. Note that any component, action, or functionality described above with respect to FIGS. 1-10 may be implemented on one or more computers configured as computer system 1100 of FIG. 11, according to various embodiments. In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180 (which may include an internal or primary display and one or more external or secondary displays, such as those described herein). In some embodiments, computer system 1100 may implement a computing device such as that illustrated as computing device 110 in FIG. 1. As previously noted, computing device 110 may include a graphics controller or card that includes one or more dedicated graphics processing units (GPUs) for hardware acceleration (not shown), and some or all of the functionality described herein as being performed may be performed by such a GPU.

In different embodiments, input/output devices 1150 may include one or more display terminals, keyboards, keypads, touchpads, scanning devices, voice or optical recognition devices, or any other devices suitable for entering or accessing data by one or more computer systems 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

In some embodiments, input/output devices 1150 illustrated in FIG. 11 may also include one or more display generation units, scaling units, and/or display drivers configured to generate (render) and/or scale image content for display on various internal, virtual and/or external display devices, as described herein. In some embodiments, input/output devices 1150 may include circuitry for managing connections between computer system 1100 and one or more external virtual display devices. A graphics controller within computer system 1100 may be configured to render objects to be displayed into one or more frame buffers in system memory 1120. The graphics controller may include one or more graphics processors (or GPUs) that may execute graphics software to perform a part or all of the graphics operation, and/or hardware acceleration of certain graphics operations. The amount of hardware acceleration and software implementation may vary from embodiment to embodiment.

In some cases, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA. In general, processors 1110 may implement any instruction set architecture, and may be configured to execute instructions defined in that instruction set architecture. The processors may employ any microarchitecture, including scalar, superscalar, pipelined, superpipelined, out of order, in order, speculative, non-speculative, etc., or combinations thereof. The processors may include circuitry, and optionally may implement microcoding techniques. The processors may include one or more L1 caches, as well one or more additional levels of cache between the processors and one or more memory controllers. Other embodiments may include multiple levels of caches in the processors, and still other embodiments may not include any caches between the processors and the memory controllers.

System memory 1120 may be configured to store program instructions 1122 including virtual display interface program instructions 1124 and/or display data 1132 accessible by processor 1110. In various embodiments, system memory 1120 may be implemented using any suitable memory technology, such as dynamic random access memory (DRAM), synchronous DRAM (SDRAM), double data rate (DDR, DDR2, DDR3, etc.) SDRAM (including mobile versions of the SDRAMs such as mDDR3, etc., low power versions of the SDRAMs such as LPDDR2, etc.), RAMBUS DRAM (RDRAM), static RAM (SRAM), nonvolatile/Flash-type memory, and/or any other type of memory. In some embodiments, one or more memory devices may be coupled onto a circuit board to form memory modules such as single inline memory modules (SIMMs), dual inline memory modules (DIMMs), etc. Alternatively, the devices may be mounted with a system on a chip in a chip-on-chip configuration, a package-on-package configuration, or a multi-chip module configuration.

In the illustrated embodiment, when executed by one or more of processors 1110, program instructions 1122 may be configured to implement an application 1124 incorporating, or taking advantage of, any of the functionality described above. For example, program instructions 1122 may be configured to control or manage virtual display devices using any or all of the techniques described herein. Additionally, virtual display data 1132 of memory 1120 may store values for one or more display parameters 1134 and/or display override parameters 1136. In other embodiments, different elements and data may be included in system memory 1120. In some embodiments, program instructions and/or data may be received, sent or stored upon different types of computer-accessible media or on similar media separate from system memory 1120 or computer system 1100. While computer system 1100 is described as implementing the functionality of functional blocks of previous figures, any of the functionality described herein may be implemented via such a computer system.

In various embodiments, memory controllers (not shown) may comprise any circuitry configured to interface to the various memory requestors (e.g. processors, graphics circuitry, etc.). Any sort of interconnect may be supported for such memory controllers. For example, a shared bus (or buses) may be used, or point-to-point interconnects may be used. Hierarchical connection of local interconnects to a global interconnect to the memory controller may be used. In one implementation, a memory controller may be multi-ported, with processors having a dedicated port, graphics circuitry having another dedicated port, etc.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network 1185 (e.g., carrier or agent devices) or between nodes of computer system 1100. Network 1185 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Those skilled in the art will appreciate that computer system 1100 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

In various embodiments, different structures within computer system 1100 may be located within a system on a chip (SoC). In one implementation, computer system 1100 includes and integrated display (such as internal display 120), an SoC, memory, and an external interface (such as external interface 130), with the SoC coupled to the display, the memory, and the interface. Other embodiments may employ any amount of integrated and/or discrete implementations.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, the method comprising:
  performing, by one or more processors:
    creating, by an operating system, one or more display interfaces, wherein the one or more display interfaces are interfaces for communication of display data and user input events between an application layer and one or more display devices physically connected to a computing system managed by the operating system;
    creating, by the operating system, one or more virtual display interfaces for communication of display data and user input events between the application layer and one or more virtual display devices not physically connected to the computing system managed by the operating system;

receiving, by one of the display interfaces, display data from, and sending user input events to, an application executing in the application layer; and receiving, by one of the virtual display interfaces, display data from, and sending user input events to, another application executing in the application layer.

2. The method of claim 1, further comprising:

rendering, based on output of the other application, using hardware acceleration provided by a graphics processing unit, display data for display on the virtual display device.

3. The method of claim 1, further comprising:

transmitting the display data from the virtual display device to a target display device over a radio frequency connection.

4. The method of claim 1, further comprising:

transmitting over a network connection the display data from the virtual display device to a remote computing system connected to a target display device.

5. The method of claim 1, further comprising:

generating, using the one or more processors, output representing attributes of a window, wherein the window displays the interactive elements of a graphical user interface on at least one of the one or more virtual display devices using at least one of the virtual display interfaces in a simulation of a virtual display; and rendering, using hardware acceleration provided by a graphics processing unit, the output for display on the one or more virtual display devices; and displaying, on the at least one of the plurality of display devices using at least one of the display interfaces, the output for display on the one or more virtual display devices.

6. The method of claim 1, further comprising:

generating, using the one or more processors, output representing attributes of a window, wherein the window displays the interactive elements of a graphical user interface on at least one of the one or more virtual display devices using at least one of the virtual display interfaces in a simulation of a virtual display; and rendering, using hardware acceleration provided by a graphics processing unit, the output for display on the one or more virtual display devices; and comparing to expected values the output for display on the one or more virtual display devices to appraise display performance.

7. The method of claim 1, further comprising:

verifying a permission of a remote computing system housing a target display device to display the display data; and transmitting the display data over a network connection to the remote computing system connected to the target display device.

8. A system, comprising:

at least one processor; and a memory comprising program instructions, wherein the program instructions are executable by the at least one processor to:

create, by an operating system, one or more display interfaces, wherein the one or more display interfaces are interfaces for communication of display data and user input events between an application layer and one or more display devices physically connected to a computing system managed by the operating system;

create, by the operating system, one or more virtual display interfaces for communication of display data and user input events between the application layer and one or more virtual display devices not physically connected to the computing system managed by the operating system;

receive, by one of the display interfaces, display data from, and send user input events to, an application executing in the application layer; and receive, by one of the virtual display interfaces, display data from, and send user input events to, another application executing in the application layer.

9. The system of claim 8, wherein the program instructions are further executable to:

render, based on output of the other application, using hardware acceleration provided by a graphics processing unit, display data for display on the virtual display device.

10. The system of claim 8, wherein the program instructions are further executable to:

transmit the display data from the other application to a target display device over a radio frequency connection.

11. The system of claim 8, wherein the program instructions are further executable to:

transmit over a network connection the display data from other application to a remote computing system connected to a target display device.

12. The system of claim 8, wherein the program instructions are further executable to:

generate output representing attributes of a window, wherein the window displays the interactive elements of a graphical user interface on at least one of the one or more virtual display devices using at least one of the virtual display interfaces in a simulation of a virtual display;

render, using hardware acceleration provided by a graphics processing unit, the output for display on the one or more virtual display devices; and display, on the at least one of the plurality of display devices using at least one of the display interfaces, the output for display on the one or more virtual display devices.

13. The system of claim 8, wherein the program instructions are further executable to:

generate, using the at least one processor, output representing attributes of a window, wherein the window displays the interactive elements of a graphical user interface on at least one of the one or more virtual display devices using at least one of the virtual display interfaces in a simulation of a virtual display;

render, using hardware acceleration provided by a graphics processing unit, the output for display on the one or more virtual display devices; and compare to expected values the output for display on the one or more virtual display devices to appraise display performance.

14. The system of claim 8, wherein the program instructions are further executable to:

verify a permission of a remote computing system housing a target display device to display the display data; and transmit the display data over a network connection to the remote computing system connected to the target display device.

15. A non-transitory computer-readable storage medium storing program instructions, wherein the program instructions are computer-executable to implement:
- creating, by an operating system, one or more display interfaces, wherein the one or more display interfaces are interfaces for communication of display data and user input events between an application layer and one or more display devices physically connected to a computing system managed by the operating system;
- creating, by the operating system, one or more virtual display interfaces for communication of display data and user input events between the application layer and one or more virtual display devices not physically connected to the computing system managed by the operating system;
- receiving, by one of the display interfaces, display data from, and sending user input events to, an application executing in the application layer; and
- receiving, by one of the virtual display interfaces, display data from, and sending user input events to, another application executing in the application layer.

16. The non-transitory computer-readable storage medium of claim 15, wherein the program instructions are further computer-executable to implement:
- rendering, based on output of the other application, using hardware acceleration provided by a graphics processing unit, display data for display on the virtual display device.

17. The non-transitory computer-readable storage medium of claim 15, wherein the program instructions are further computer-executable to implement:
- transmitting the display data from the other application to a target display device over a radio frequency connection.

18. The non-transitory computer-readable storage medium of claim 15, wherein the program instructions are further computer-executable to implement:
- transmitting over a network connection the display data from the other application to a remote computing system connected to a target display device.

19. The non-transitory computer-readable storage medium of claim 15, wherein the program instructions are further computer-executable to implement:
- generating output representing attributes of a window, wherein the window displays the interactive elements of a graphical user interface on at least one of the one or more virtual display devices using at least one of the virtual display interfaces in a simulation of a virtual display;
- rendering, using hardware acceleration provided by a graphics processing unit, the output for display on the one or more virtual display devices; and
- displaying, on the at least one of the plurality of display devices using at least one of the display interfaces, the output for display on the one or more virtual display devices.

20. The non-transitory computer-readable storage medium of claim 15, wherein the program instructions are further computer-executable to implement:
- generating output representing attributes of a window, wherein the window displays the interactive elements of a graphical user interface on at least one of the one or more virtual display devices using at least one of the virtual display interfaces in a simulation of a virtual display;
- rendering, using the hardware acceleration provided by the graphics processing unit, the output for display on the one or more virtual display devices; and
- comparing to expected values the output for display on the one or more virtual display devices to appraise display performance.

* * * * *